April 17, 1956  J. THEVENAZ  2,741,965
ROTARY OBJECTIVE-CARRYING TURRETS FOR PHOTOGRAPHIC APPARATUS
Filed March 12, 1951  3 Sheets-Sheet 1

INVENTOR
Jean Thevenaz.

BY

ATTORNEY

April 17, 1956     J. THEVENAZ     2,741,965
ROTARY OBJECTIVE-CARRYING TURRETS FOR PHOTOGRAPHIC APPARATUS
Filed March 12, 1951     3 Sheets-Sheet 2
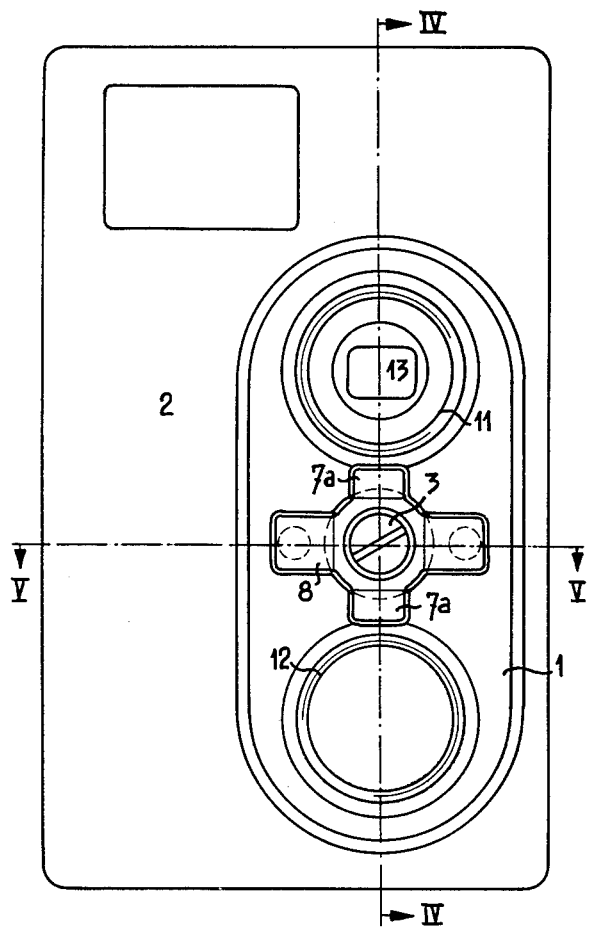
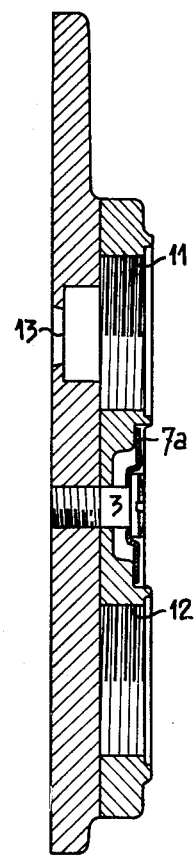
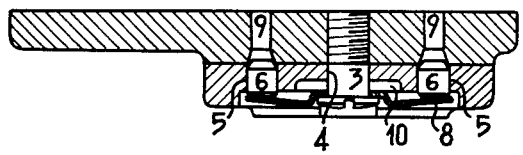
INVENTOR
Jean Thevenaz.
BY
ATTORNEY April 17, 1956  J. THEVENAZ  2,741,965
ROTARY OBJECTIVE-CARRYING TURRETS FOR PHOTOGRAPHIC APPARATUS
Filed March 12, 1951  3 Sheets-Sheet 3
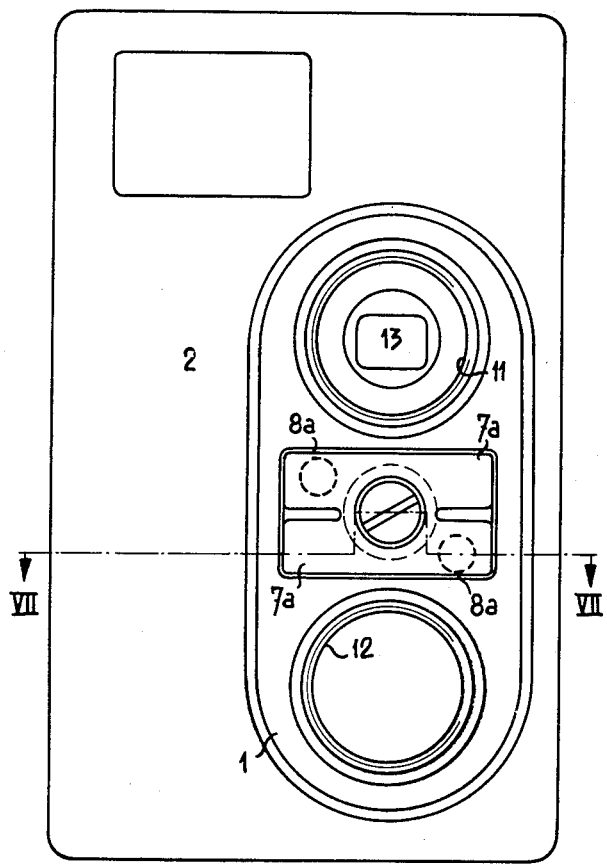
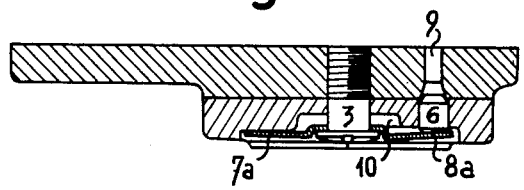
INVENTOR
Jean Thevenaz.
BY
ATTORNEY United States Patent Office 2,741,965
Patented Apr. 17, 1956

2,741,965
ROTARY OBJECTIVE-CARRYING TURRETS FOR PHOTOGRAPHIC APPARATUS

Jean Thevenaz, Yverdon, Switzerland, assignor to Paillard S. A., Sainte-Croix, Switzerland, a corporation of Switzerland Application March 12, 1951, Serial No. 215,088

Claims priority, application Switzerland March 28, 1950

5 Claims. (Cl. 95—45)

The invention has for its subject a rotary objective-carrying turret mounted on a pivot secured to the front face of a photographic apparatus, comprising a support and at least one stop member capable of sliding in the said support for co-operating with a seating provided on the front face of a photographic apparatus.

Different types of objective carrying turrets are in existence. In some of these the stop member is mounted on the photographic apparatus and the marking of the angular position of the turret on the apparatus is effected at the periphery thereof. This type of turret has some disadvantages. On the one hand the stop member applies a radial pressure on the pivotal axis of the support, which pressure may be the cause of premature wear on the pivotal axis and may, when a predetermined clearance exists between the pivotal axis and the support, produce eccentricity of the turret relative to the photographing window of the apparatus. On the other hand, the marking of the angular position of the turret on its periphery increases the total overall size of the turret, creating an assembly of poor appearance especially in the case of photographic apparatus of small size.

In another type of objective-carrying turret, the support is held applied against the photographic apparatus by a spring and a stop member, for example a ball, is located in a seating of the support. A spring bears against the support and tends to cause it to project from its seating in order to engage with recesses provided in the adjacent face of the apparatus. This type of turret has a disadvantage. In fact, the force applied to the stop member by its spring counteracts the force applied by the spring to hold the support applied against the adjacent face of the apparatus. Because of this counteracting force it is necessary to provide, on the pivotal axis, a large powerful spring which has sufficient force to hold the support against the photographic apparatus.

The disadvantage referred to in connection with the last mentioned type of turret also exists in another type similar to this, but in which the stop member and its spring are located in the photographic apparatus, the stop member engaging with recesses of the support.

The objective-carrying turret forming the subject of the invention is distinguished from known turrets by the fact that it is provided with at least one spring bearing on the pivotal spindle and ensuring on the one hand the pressure of the support on the front face of the apparatus and actuating on the other hand, in an independent manner, the stop member.

One form of construction of the said turret is shown diagrammatically and by way of example in the accompanying drawings, wherein:

Figure 3 is a front view of another embodiment showing the turret mounted on a photographic apparatus, especially a cinematographic photographic apparatus.

Figure 4 is a section on the line IV—IV of Figure 3.

Figure 5 is a section on the line V—V of Figure 3.

Figure 6 is a front view of still another embodiment showing the turret mounted on a photographic apparatus, especially a cinematographic photographic apparatus.

Figure 7 is a section on the line VII—VII of Figure 6.

Figure 1:
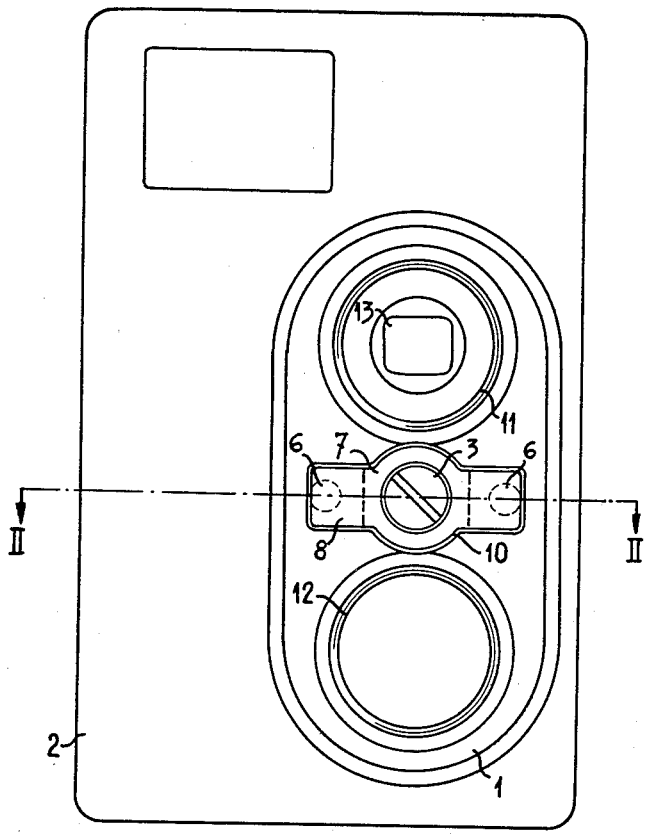
Fig. 1 is a front view of the turret mounted on a photographic apparatus, especially a cinematographic photographic apparatus.
Figure 2:
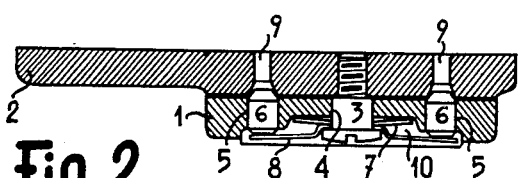
Fig. 2 is a section on the line II—II of Fig. 1.

With particular reference to Figures 1 and 2, the objective-carrying turret is provided with a support 1 adapted to be mounted pivotally on the front face 2 of a photographic apparatus. The pivotal axis of the said support 1 is formed by a headed screw 3 threaded into a bore provided in the front face 2 of the apparatus and passing through a bore 4 of the support 1. The support 1, in addition, has two bores 5 diametrically opposed relatively to the pivotal axis, each bore serving as a seating for a stop member 6 formed by a plunger piston. Two blade springs 7 and 8, each having a central bore, are threaded on the screw 3 and bear against the head thereof. The ends of the spring 7 apply a pressure against the support 1 so as to hold it applied against the front face 2 of the apparatus. The ends of the spring 8 bear against the stop members 6 tending to force them out of their seatings 5. Two holes 9 are provided in the front face 2 of the apparatus and serve as attaching points for the stop members 6. The springs 7 and 8 and the head of the screw 3 are located in a recess 10 of the support 1.

In the embodiments shown, the turret is adapted to support two objectives. For this reason the support 1 has two bores 11 and 12 each adapted to receive an objective.

Referring to the embodiment of Figures 1 and 2, the stop members 6 are so arranged relatively to the bores 11 and 12, and the holes 9 are located at such points relatively to the photographing aperture 13 of the apparatus that when the plunger pistons are each engaged in the holes 9, one of the bores 11 and 12 is accurately centred in front of the aperture 13. The holes 9 have a recessed part in the form of a truncated cone. Further the plunger pistons have a portion of corresponding truncated shape. For this reason when a force is applied tending to cause the turret to pivot relatively to the photographic apparatus the truncated parts of the holes and of the plunger pistons co-operate with one another so as to push the plunger pistons into the interior of their seatings 5 and against the spring 8. The plunger pistons then slide on the front face 2 of the apparatus until the rotation of the turret again brings them opposite other holes 9.

In the form of construction shown, the line connecting together the holes 9 is perpendicular to the line passing through the centre of the bores 11 and 12 when one thereof is opposite the photographing aperture 13. However, it should be understood that it is not necessary that these two lines be perpendicular to one another; on the contrary they may form with one another any angle. For example when the turret is to be provided with more than two objectives, the support 1 should be of sufficient width to accommodate three or more bores, similar to bores 11 and 12, concentric with the pivotal axis of the support 1.

Instead of two stop members, only one may be provided, which is capable of co-operating successively with a number of holes 9, the number of holes 9 corresponding with the number of bores 11, 12.

It is also possible to provide a number of stop members equal in number to the bores 11, 12. All the stop members being capable of co-operating successively with a single hole 9.

In another modification as shown in Figures 3, 4 and 5, the two springs 7 and 8 may be replaced by a single spring. This spring may have the shape of the spring 8, but may further be provided with two oppositely located extensions 7a, 7a adapted to come to bear against the support 1. The line connecting the bearing points of the spring against the stop member 6 and the line connecting the bearing points of the spring on the support 1 may form between them a right angle, the blade of the spring then having the shape of a cross. However, the angle formed by these two lines may also be of any degree. In a further modification, as shown in Figures 6 and 7, the spring may be formed by a blade having a central hole for the headed screw 3 and a central longitudinal slot at each of its ends. Thus, each end of the blade is divided into two parts acting in a separate manner; two opposed parts 8a, 8a of the spring tend to drive the stop members 6 out of their seatings 5 whilst the other two opposed parts 7a, 7a thereof bear against the support 1.

The stop members 6, instead of being formed by plunger pistons, may be formed by balls or rollers of any shape. Further, the holes 9 may be replaced by recesses, grooves or even by slots provided in the face 2 of the photographing apparatus.

The turret described with reference to the drawing is adapted to be applied to a cinematographic photographing apparatus; however, it will be understood that an objective-carrying turret of this character may also be applied to other types of photographing apparatus.

From the foregoing description it is seen that the force produced by the spring or by the part of the spring on the support 1 is transmitted to the adjacent face of the photographing apparatus without the spring or the part of the spring bearing agains the stop members opposing this force.

I claim:

1. A photographic apparatus comprising a casing having a front face, said face having a photographing aperture therein, a pivot secured to said casing and projecting from said front face, a turret rotatably mounted on said pivot, means on said turret for carrying a plurality of objectives, said turret having a central recessed portion through which said pivot projects, retaining means formed on said pivot, resilient means for pressing said turret against said front face, said means being positioned in said recessed portion and acting between said retaining means and said turret, said front face having a plurality of truncated cone-shaped bores concentrically spaced about said pivot, said turret having a bore adapted to register with said truncated cone-shaped bores, a plunger having a truncated cone-shaped portion slidably mounted in said turret bore, said bores and said plunger being positioned away from the periphery of said turret, and spring means for urging said plunger into cooperation with said truncated cone-shaped bores, said spring means being positioned both in said recessed portion of said turret and opposite and against said plunger and acting on said plunger and reacting on said retaining means, whereby, when a force is applied for rotating the turret relative to the front face, the truncated cone-shaped bores and the truncated cone-shaped portion of the plunger cooperate with each other thereby pushing the plunger into the interior of the respective turret bore and against said spring means and thus prevent wear of the pivot and unnecessary axial pressure of said turret against said front face.

2. A photographic apparatus comprising a casing having a front face, said face having a photographic aperture therein, a pivot secured to said casing and projecting from said front face, a turret rotatably mounted on said pivot, means on said turret for carrying a plurality of objectives, said turret having a central recessed portion through which said pivot projects, a retaining means formed on said pivot, resilient means for pressing said turret against said front face, said means being positioned in said recessed portion and acting between said retaining means and said turret, said front face having a plurality of truncated cone-shaped bores spaced along a circle concentric with said pivot, said turret having a plurality of bores adapted to register with truncated cone-shaped bores, a plurality of plungers slidably mounted in the said respective turret bores, each of said plungers having a truncated cone-shaped portion, said bores and said plungers being positioned away from the periphery of said turret, and spring means for urging said plungers into cooperation with said truncated cone-shaped bores, said spring means being positioned both in said recessed portion of said turret and opposite and against said plungers and acting on said plungers and reacting on said retaining means, whereby, when a force is applied for rotating the turret relative to the front face, the truncated cone-shaped bores and the truncated cone-shaped portion of the plungers cooperate with each other thereby pushing the plunger into the interior of the respective turret bore and against said spring means and thus prevent wear of the pivot and unnecessary axial pressure of said turret against said front face.

3. The apparatus of claim 1 wherein the resilient means and spring means are constituted by a cruciform shape leaf spring.

4. The apparatus of claim 1 wherein the resilient means and the spring means are constituted by a leaf spring having integral therewith a plurality of arms.

5. The apparatus of claim 2 wherein two of said plungers are in diametrically opposed positions with respect to the pivot, and wherein the resilient means and spring means comprise a leaf spring having a plurality of arms.

References Cited in the file of this patent

UNITED STATES PATENTS

| | | |
|---|---|---|
| 709,079 | Donitz | Sept. 16, 1902 |
| 807,149 | Berger | Dec. 12, 1905 |
| 1,884,169 | Owens | Oct. 25, 1932 |
| 2,482,571 | Arnold | Sept. 20, 1949 |
| 2,496,269 | Cisski | Feb. 7, 1950 |
| 2,556,546 | Lee | June 12, 1951 |